March 26, 1963  J. V. MAKOWSKI ET AL  3,083,001

WIRE SPRING ELEMENT

Filed May 26, 1961

JOSEPH V. MAKOWSKI
MICHAEL CASTELLO
INVENTORS

BY John R. Faulkner
John J. Roethel
ATTORNEYS

United States Patent Office 3,083,001
Patented Mar. 26, 1963

3,083,001
WIRE SPRING ELEMENT
Joseph V. Makowski, Farmington, and Michael Castello, Detroit, Mich., assignors to Ford Motor Company, Dearborn, Mich., a corporation of Delaware
Filed May 26, 1961, Ser. No. 112,849
5 Claims. (Cl. 267—107)

This invention relates to a seat cushion construction and in particular to a seat cushion wire spring element.

One common form of seat cushion construction employs a plurality of parallel, transversally extending wire spring elements. The ends of the respective elements are secured to front and rear seat frame members. The load supporting portion of each element is formed with parallel cross bars joined by straight or curved side bars. The cross bars function as individual torsion bars to provide a resilient cushioning for the occupant of the seat. This type of cushion construction is particularly common in motor vehicle seats. Although the particular conformation of the individual spring elements may vary in different constructions, the described spring elements are generically termed "zig-zag" springs.

The resilient spring effect provided by the intermediate cross bars of the zig-zag spring elements offers a satisfactory degree of resilience. The portion of a spring element adjacent to the point of attachment to the seat frame, however, resists deflection because it is loaded primarily in tension. This results in increased rigidity of the ends of the spring elements. Some way must, therefore, be provided to increase the resilience of the ends of the individual spring elements to provide a comfortable support over the entire length of the spring.

In vehicular seat cushion constructions, one common expedient utilized to increase the resilience at the ends of the spring elements is the incorporation of a fishmouth shaped attaching section. The spring cross bars that coincide with the several apexes of the fishmouth section are subjected to sufficient torsional stress to raise the resilience at the ends of the elements the desired degree.

The use of fishmouth sections at the forward portion of a vehicular seat cushion offers a satisfactory construction. Several factors, however, limit the feasibility of utilizing a fishmouth section at the rear of a vehicular seat cushion. The height available at the rear of a vehicular seat cushion is often insufficient to satisfy the spacial requirements of the fishmouth section. The rear portion of the seat cushion is also subjected to the highest degree of loading. It has been, therefore, necessary to furnish auxiliary tension wires in conjunction with the rear fishmouth section to limit the maximum stress exerted on the rear cross bars to prevent permanent deformation.

It is an object of this invention to provide a zig-zag wire seat spring element that has the desired degree of resilience at all points along its length.

It is a further object of this invention to provide a zig-zag spring element end construction that, in a minimum of space, increases the localized resilience of the spring element and does not require the use of auxiliary tension springs.

It is a still further object of this invention to provide a resilient end construction for a wire spring element resistant to permanent deformation.

The spring element of the present invention consists of a load supporting portion formed with parallel transverse torsion bars joined by side bars at alternate sides. The rearward end of the spring element is formed with a convolution which results in the formation of two additional torsion bar spring elements which tend to move together as loads are imposed on the spring element. The convolution ends in a final transverse torsion bar spring element the remote end of which is secured to the seat frame.

Further objects and advantages of the invention will become more obvious as this description proceeds particularly when considered in conjunction with the accompanying drawings, wherein.

Figure 1:
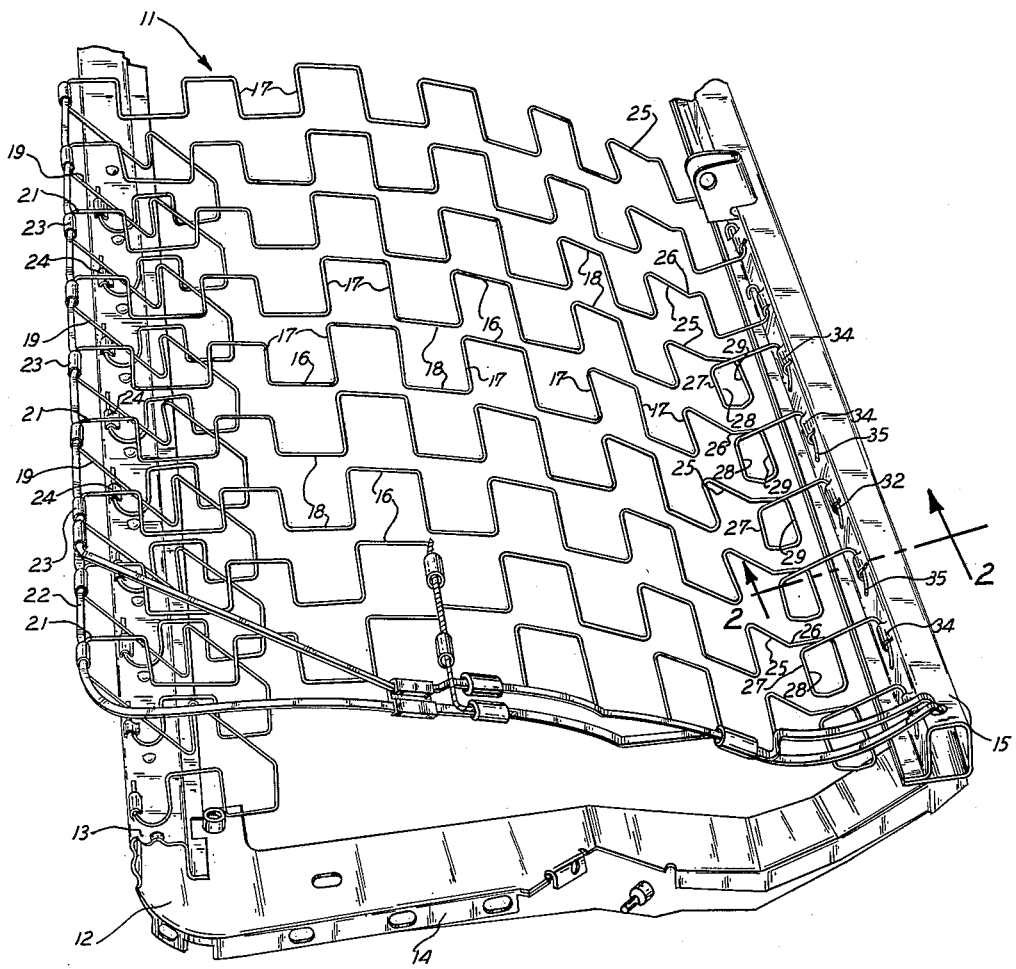
FIGURE 1 is a perspective view of a portion of a seat cushion embodying the present invention with the upholstery removed to more clearly show the construction.

Referring now in detail to the drawings, there is shown generally at 11 the cushion portion of the vehicular seat assembly. Cushion assembly 11 is built up on a frame 12 which includes front 13, side 14 and rear 15 rails.

Extending between front frame rail 13 and rear frame rail 15 are a plurality of zig-zag wire spring elements 16. Each spring element 16 is formed with a convex load supporting portion made up of a plurality of parallel transverse cross bar elements 17 joined at alternate sides by the side bars 18. Cross bars 17 deflect torsionally under the effect of the weight of the occupant of the seat to provide a resilient support.

The forward end of the load supporting portion of each spring element 16 terminates in a fishmouth shaped section 19. The torsion bar 21 at the uppermost apex of the fishmouth section of each element is secured to a top border wire 22 as by the clamps 23. The forward or free end of each spring element 16 extends through retainer 24 formed in front frame rail 13 to secure the forward portion of the spring elements 16 to frame 12.

The rearward terminal side bar 25 of each spring element 16 angularly meets, as at 26, a convolution, generally designated 27, formed in each element. Convolution 27 forms a part of the resilient rearward attachment portion of each element.

Figure 2:
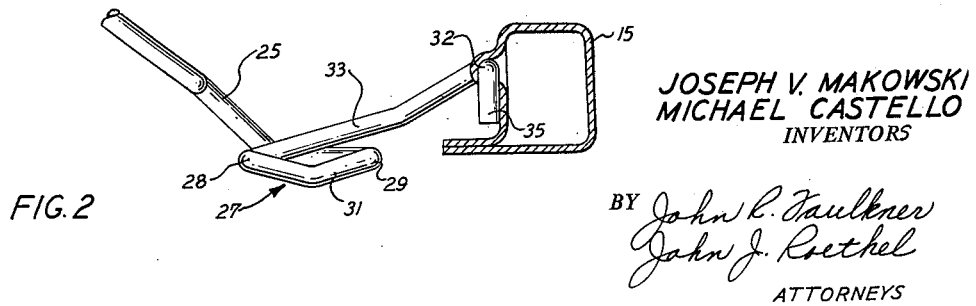
FIGURE 2 is a cross sectional view taken along line 2—2 of FIGURE 1.

Convolution 27 is formed to provide parallel torsion bars 28 and 29 which form the forward and intermediate torsion bars of the rearward attaching portion. The bars 28 and 29 are joined by an angularly deformed side bar 31 at the side opposite to that at which side bar 25 joins intermediate torsion bar 29. Forward torsion bar 28 is connected to a torsion bar 32 spaced rearwardly of the intermediate torsion bar 29 by an angularly deformed side bar 33 that passes over the intermediate torsion bar 29. Rearward torsion bar 32 passes through a retaining portion 34 of rear frame rail 15. The end of rearward torsion bar 32 is restrained from rotation by the contact of its downturned end 35 with rear frame rail 15 (FIG. 2). It should be noted that the parallel forward and intermediate torsion bars 28 and 29 define a plane that passes below the rearward torsion bar 32.

The effect of the weight of the seat occupant acting on the load supporting portion of element 16 will be transmitted to the rear attaching portion through side bar 25. The force will cause torsion bars 28, 29 and 32 to deflect torsionally thus increasing the resilience of the rear portion of element 16. It should also be noted that the construction causes forward 28 and intermediate 29 bars to close under load rather than open. This tends to reduce the possibilities of permanent deformation in the area of greatest stress.

It will be understood that the invention is not to be limited to the exact construction shown and described, but that various changes and modifications may be made without departing from the spirit and scope of the invention, as defined by the appended claims.

What is claimed is:

1. A wire spring element formed with a convex load supporting portion formed of parallel transverse cross bars joined by side bars at alternate sides thereof and terminating at each end in resilient end attaching portions, at least one of said resilient end attaching portions including at least two spaced transverse torsion bars separated by an intermediate torsion bar, said intermediate torsion bar of said resilient end attaching portion being joined at one side thereof with an angularly formed terminal side bar of the load supporting portion, a side bar connecting one of said spaced torsion bars with said intermediate torsion bar at the other side thereof, a further side bar passing over said intermediate torsion bar and connecting said one of said spaced torsion bars and the other of said spaced torsion bars, and means preventing rotation of one of said torsion bars whereby all of said torsion bars will be subjected to torsional stresses when loads are imposed on said load supporting portion.

2. A wire spring element formed with a convex load supporting portion formed of parallel transverse cross bars joined by side bars at alternate sides thereof and terminating in resilient forward and rearward end attaching portions, said forward end attaching portions being in the form of a fishmouth section, said resilient rearward end attaching portions including at least two transverse torsion bars and an intermediate torsion bar, said intermediate torsion bar being joined at one side thereof with an angularly formed side bar of said load supporting portion, a side bar connecting the forwardmost torsion bar of said resilient end attaching portion with said intermediate torsion bar at the other side thereof, a further side bar passing over said intermediate torsion bar and connecting said forwardmost torsion bar and one side of the rearwardmost torsion bar of said resilient end attaching portion, and means preventing rotation of the other side of said rearwardmost torsion bar whereby said torsion bars will be subjected to torsional stresses when loads are imposed on the load supporting portion.

3. In a seat cushion construction including a seat frame having front and rear frame rails, a plurality of wire spring elements extending between said front and rear frame rails, each of said spring elements being formed with a convex load supporting portion formed with parallel transverse cross bars joined by side bars at alternate sides thereof and terminating in resilient forward and rearward end attaching portions, said forward end attaching portion being in the form of a fishmouth section, means operatively connecting the terminal portion of each of said fishmouth sections with said front frame rail, said resilient end attaching portion including forward, intermediate and rearward parallel transverse torsion bars, said intermediate torsion bar being joined at one side thereof with angularly formed terminal side bar of said load supporting portion, a side bar connecting said forward torsion bar with said intermediate torsion bar at the other side thereof, a further side bar passing over said intermediate torsion bar and connecting said forward torsion bar and one side of said rearward torsion bar, and means operatively securing the other side of said rearward torsion bar of each of said spring elements to said rear frame rail whereby said forward, intermediate and rearward torsion bars will be subjected to torsional stresses and said forward and intermediate torsion bars will move closer together when loads are imposed upon said load supporting portion.

4. A wire spring element formed with a zig-zag shaped load supporting portion terminating in forward and rearward end attaching portions, the wire of said forward end attaching portion being in the form of a fishmouth section and the wire of said rearward end attaching portion having a convolution formed contiguous to the rearward point of attachment, said convolution being formed with at least two substantially straight sections extending in a direction transverse to said load supporting portion, and means including a side bar at one side of the forwardmost of said straight sections passing over the other of said straight sections providing said rearward point of attachment whereby loads imposed upon said load supporting portion will cause torsional deflections of said straight sections.

5. A wire spring element formed with a zig-zag shaped load supporting portion terminating at each end in resilient end attaining portions, at least one of said resilient end attaching portions including at least two spaced transverse torsion bars separated by an intermediate torsion bar, said intermediate torsion bar of said resilient end attaching portion being joined at one side thereof with a terminal side bar of said load supporting portion, a side bar connecting the forwardmost of said torsion bars with said intermediate torsion bar at the other side thereof, a further side bar connecting said forwardmost bar and the rearwardmost of said torsion bars, said forwardmost and said intermediate torsion bars defining a plane passing below said rearwardmost torsion bar, and means preventing rotation of said rearwardmost torsion bar whereby all of said torsion bars will be subjected to torsional stresses when loads are imposed upon said load supporting portion.

References Cited in the file of this patent
UNITED STATES PATENTS

| 2,684,844 | Flint et al. | July 27, 1954 |
| 2,731,075 | Flint | Jan. 17, 1956 |
| 2,910,115 | Meyers | Oct. 27, 1959 |